(12) United States Patent
Moon et al.

(10) Patent No.: US 11,498,427 B2
(45) Date of Patent: Nov. 15, 2022

(54) TRANSPORTING ROBOT AND METHOD FOR OPERATING THE SAME, SYSTEM FOR CONTROLLING THE TRANSPORTING ROBOT

(71) Applicant: LG ELECTRONICS INC., Seoul (KR)

(72) Inventors: Sungmin Moon, Seoul (KR); Sang Hak Lee, Hanam-si (KR); Nak Yeong Kim, Seoul (KR); Sung Jin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 16/796,329

(22) Filed: Feb. 20, 2020

(65) Prior Publication Data
US 2021/0094423 A1 Apr. 1, 2021

(30) Foreign Application Priority Data

Sep. 27, 2019 (KR) .......................... 10-2019-0119789

(51) Int. Cl.
*B60L 7/10* (2006.01)
*B60W 10/08* (2006.01)
*B60W 10/26* (2006.01)
*G05D 1/02* (2020.01)

(52) U.S. Cl.
CPC ............... *B60L 7/10* (2013.01); *B60W 10/08* (2013.01); *B60W 10/26* (2013.01); *G05D 1/0217* (2013.01); *G05D 1/0295* (2013.01); *B60W 2510/08* (2013.01); *B60W 2510/242* (2013.01); *B60W 2552/15* (2020.02)

(58) Field of Classification Search
CPC .... B60L 7/10; B60L 2200/30; B60L 2260/32; B60L 15/42; B60W 10/08; B60W 10/26; B60W 2510/242; B60W 2510/08; B60W 2552/15; G05D 1/0217; G05D 1/0295; G05D 1/0293; G05D 2201/0213; B25J 5/007; B25J 9/161; B25J 9/1669; B25J 9/1682; B25J 19/02; B25J 11/008; Y02T 90/16
See application file for complete search history.

(56) References Cited

U.S. PATENT DOCUMENTS 9,940,840 B1\* 4/2018 Schubert ............ G01C 21/3407
2014/0180914 A1\* 6/2014 Abhyanker ............ G05D 1/102
705/332
2017/0102711 A1\* 4/2017 Watts .................... G05D 1/0231

FOREIGN PATENT DOCUMENTS

KR 10-2012-0049530 5/2012
KR 10-2019-0096864 8/2019
WO WO-2020142829 A1 \* 7/2020 ............. B60L 15/20

\* cited by examiner

*Primary Examiner* — Frederick M Brushaber
*Assistant Examiner* — Matthew J. Reda
(74) *Attorney, Agent, or Firm* — KED & Associates LLP

(57) ABSTRACT

A transport robot may include a wheel driver, a power supply, and a processor. The transport robot may execute artificial intelligence (AI) algorithms and/or machine learning algorithms, and may communicate with other electronic devices in a 5G communication environment. Thus, user convenience can be improved.

10 Claims, 9 Drawing Sheets

TRANSPORTING ROBOT AND METHOD FOR OPERATING THE SAME, SYSTEM FOR CONTROLLING THE TRANSPORTING ROBOT

CROSS-REFERENCE TO RELATED APPLICATION

The present application claims benefit of priority to Korean Patent Application No. 10-2019-0119789, entitled "Transporting robot and method for operating the same, system for controlling the transporting robot," filed on Sep. 27, 2019 in the Korean Intellectual Property Office, the entirety of which is incorporated by reference herein.

BACKGROUND

1. Field

The present disclosure relates to a transport robot, a method for operating the transport robot, and a robot control system, and more particularly, a transport robot that moves by forming a group line, a method for operating the transport robot, and a robot control system for controlling the transport robot.

2. Background

The competition for article transport in online and offline markets is getting fiercer day by day, and services are provided for transporting articles purchased on the same day to provide better user convenience. Research on unmanned vehicles that transport articles is being actively conducted, and related laws are gradually being established.

An autonomous driving system disclosed in Korean Patent Application Publication No. 10-2019-0096864 (publication date: 2019 Aug. 20), the subject matter of which is incorporated herein by reference, provides a method for group driving. Specifically, a master vehicle communicates with a slave vehicle and leads the group driving. The master vehicle causes a slave vehicle disposed in a communication blind spot to move to a communicable region.

However, in the example of the autonomous driving system of Korean Patent Application Publication No. 10-2019-0096864, it is provided that although several vehicles perform group driving via wireless communication, the vehicles all move individually. Thus, from an energy perspective, there is no improvement.

Korean Patent Application Publication No. 10-2012-0049530 (publication date: 2012 May 17), the subject matter of which is incorporated herein by reference, discloses a group robot, wherein a master robot controls a plurality of slave robots to form a specific group formation.

However, in Korean Patent Application Publication No. 10-2012-0049530, only the forming of a specific group formation is disclosed, and there is a limitation in that battery efficiency cannot be improved while robots move together with a specific purpose.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
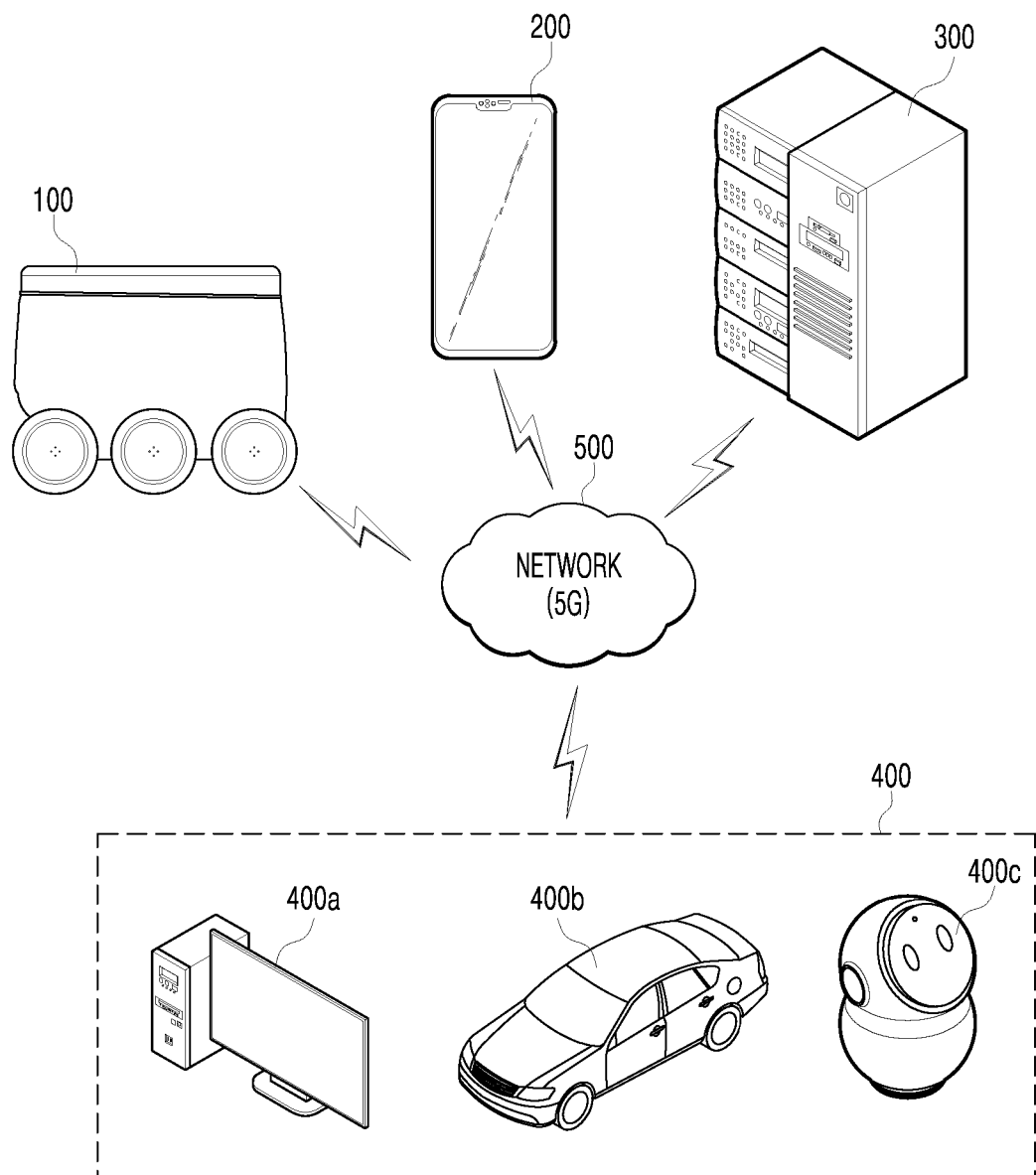
FIG. 1 is a diagram illustrating a 5G network-based cloud system according to one embodiment of the present disclosure.

Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyper-parameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method. Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

FIG. 1 illustrates a 5G network-based cloud system 1000 according to one embodiment of the present disclosure.

The cloud system 1000 may include a transport robot 100, a mobile terminal 200, a robot control system 300, various devices 400, and a 5G network 500.

The transport robot 100 is a robot that transports an article to a destination, and may move directly from a warehouse to the destination. The transport robot 100 may be loaded in a vehicle and move from the warehouse to the vicinity of the destination of the article, and then disembark in vicinity of the destination and move to the destination. The transport robot 100 may move the article to the destination not only outdoors but also indoors as well. The transport robot 100 may be implemented as an automated guided vehicle (AGV), and the AGV may be a transport device that is moved by, for example, a sensor, a magnetic field, or a vision device on the bottom surface.

The transport robot 100 may move together with a plurality of transport robots by forming a group line with the plurality of transport robots. The transport robot 100 may be connected to adjacent transport robots by a physical connector and the transport robots may move together. The connector may also be electrically connected to the adjacent transport robots.

The mobile terminal 200 may communicate with the transport robot 100 through the 5G network 500, and the mobile terminal 200 may be a device possessed by an article recipient. The mobile terminal 200 may provide information based on an image. The mobile terminal 200 may include mobile devices such as a mobile phone, a smartphone, and a wearable device, for example, a smart watch, smartglasses, and a head mounted display (HMD).

The robot control system 300 may remotely control the transport robot 100 and may respond to various requests of the transport robot 100. The robot control system 300 may set a movement route of the transport robot 100, and when the transport robot 100 moves by forming a group line, the robot control system 300 may determine the shape of the group line and the order of the transport robot 100 in the group line.

Figure 10:
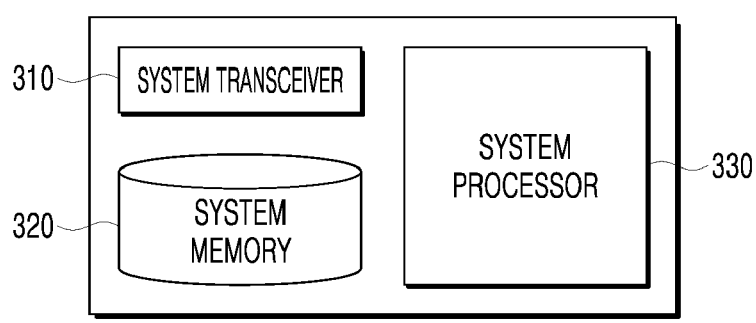
FIG. 10 is a block diagram illustrating a configuration of a robot control system according to one embodiment of the present disclosure.

The robot control system 300 may store the neural network model in a system memory 320 (FIG. 10). The robot control system 300 may perform an operation corresponding to the arrangement position and transport reliability (accuracy) of the transport robot based on the neural network model.

The various devices 400 may include, for example, a personal computer (PC) 400a, an autonomous vehicle 400b, and a home robot 400c. When the transport robot 100 arrives at the transport destination of the article, the transport robot 100 may deliver the article directly to the home robot 400c through the communication with the home robot 400c.

The various devices 400 may be connected to, for example, the transport robot 100, the mobile terminal 200, and the robot control system 300 through the 5G network 500 in a wired or wireless manner.

The transport robot 100, the mobile terminal 200, the robot control system 300 and the various devices 400 are all equipped with a 5G module capable of transmitting and receiving data at a rate of 100 Mbps to 20 Gbps (or higher), so that a large capacity video files may be transmitted to various devices. In addition, the robot 100, the mobile terminal 200, the robot control system 300, and the various devices 400 may be operated at a low power to minimize power consumption. However, the transmission rate may be implemented differently according to an embodiment.

The 5G network 500 may include, for example, a 5G mobile communication network, a local area network, and the Internet, and provide a communication environment to devices in a wired or wireless manner.

Figure 2:
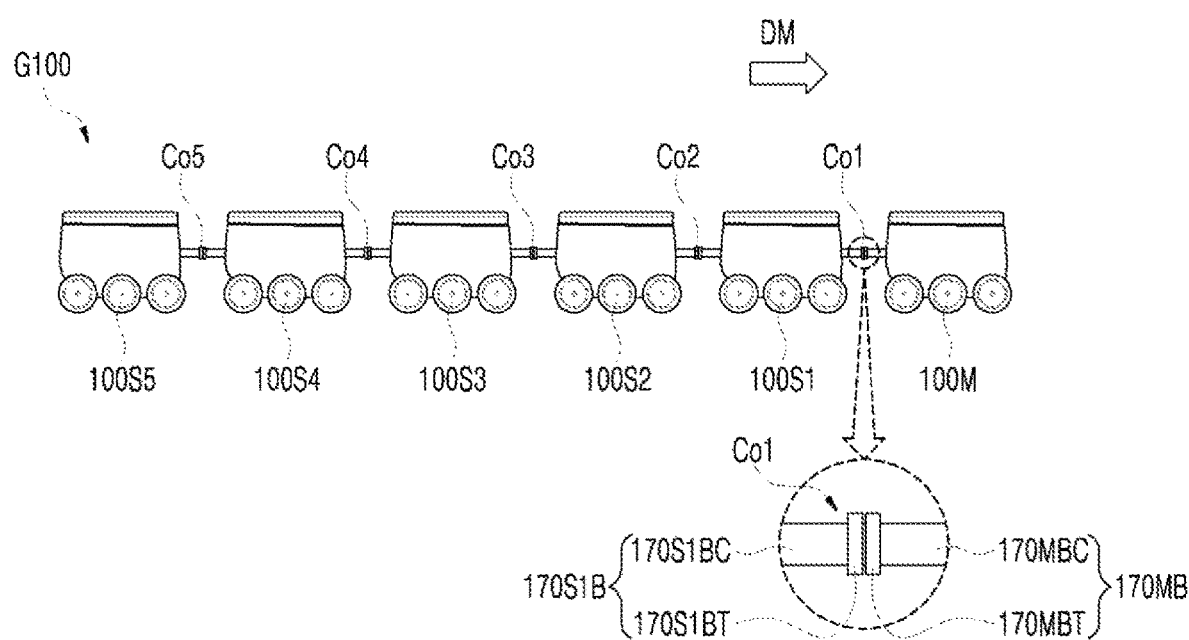
FIGS. 2 and 3 are diagrams for explaining a plurality of transport robots forming a group line, according to various embodiments of the present disclosure.
Figure 3:
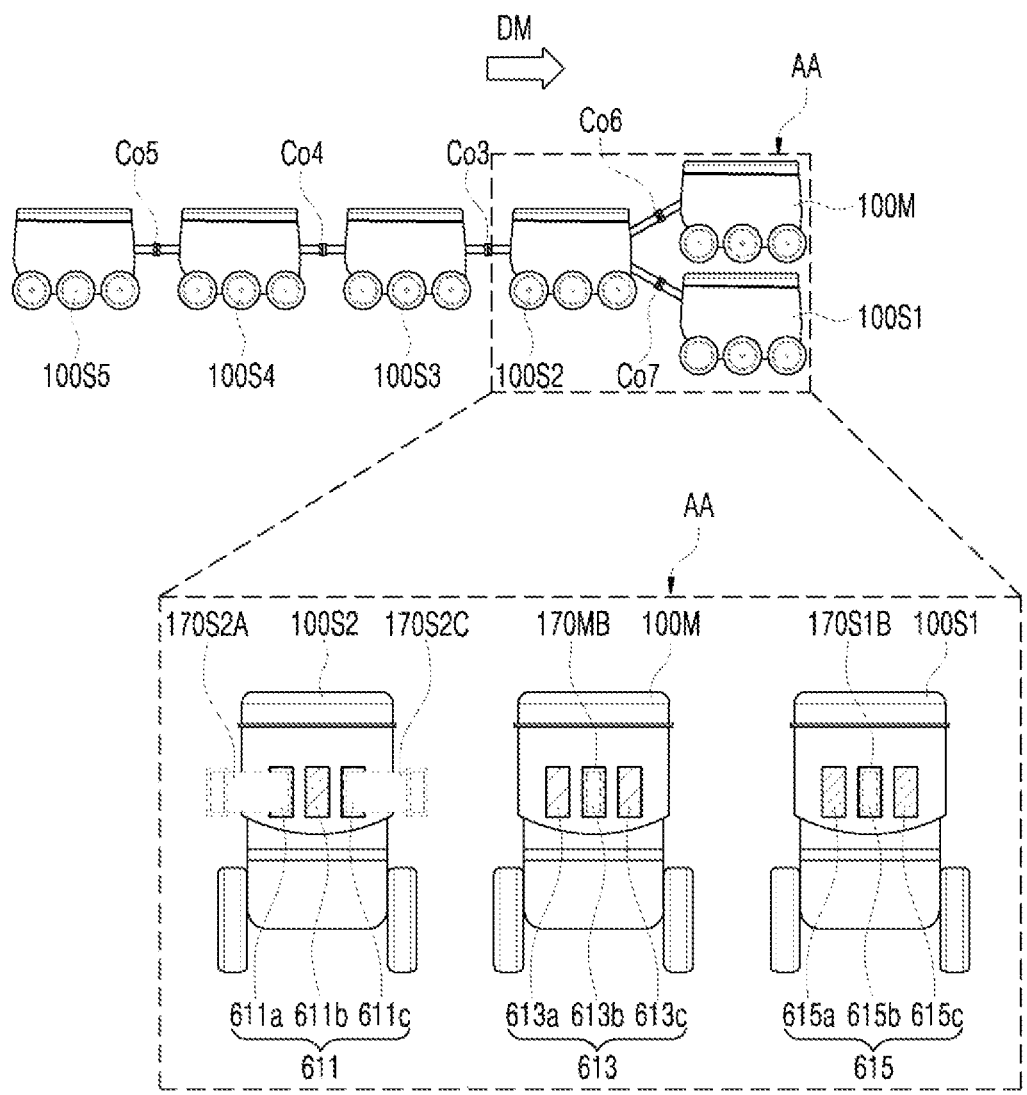

FIGS. 2 and 3 are diagrams for explaining a plurality of transport robots 100M to 100S5 forming a group line, according to various embodiments of the present disclosure. The plurality of transport robots 100M to 100S5 forming the group line may be referred to as a cluster transport robot G100. In an alternative or additional embodiment, the cluster transport robot G100 may include more or fewer transport robots.

According to an embodiment, the cluster transport robot G100 may not only be a transport robot for transporting an article but may include a transport robot having only a battery, and the transport robot 100 may be charged by a battery of an adjacent transport robot.

The cluster transport robot G100 may include a master transport robot 100M and a plurality of slave transport robots 100S1 to 100S5. The master transport robot 100M and the plurality of slave transport robots 100S1 to 100S5 may be implemented as an electric vehicle (EV) based on an automated guided vehicle (AGV), but may be implemented as a hybrid type vehicle in an alternative embodiment. As shown in FIG. 2, all of the transport robots 100M to 100S5 included in the cluster transport robot G100 may be implemented with the same specification. However, in an alternative embodiment, transport robots of different sizes may be connected.

The master transport robot 100M may be disposed at the lead position of the line, but the embodiment is not limited thereto. The master transport robot 100M may communicate with the plurality of slave transport robots 100S1 to 100S5 and monitor the remaining charge amount of the slave transport robots 100S1 to 100S5, which is enabled through wireless communication or a physically connected connector.

The transport robot 100M at the lead position may consume the most power among the transport robots in the group line, and the transport robot 100S5 at the end position may consume the next most power. Accordingly, the cluster transport robot G100 may adjust an arrangement order of the transport robots while moving.

The plurality of transport robots 100M to 100S5 included in the cluster transport robot G100 may be connected by connector connections Co1 to Co5, and the connector connections Co1 to Co5 represent connections between physical and/or electrical connectors mounted on or coupled to the transport robots. Among the connector connections Co1 to Co5, a first connector connection Co1 between the master transport robot 100M and the slave transport robot 100S1 at the next position will be described.

The master transport robot 100M may include a first connector 170MB at a predetermined point of a main body so as to face the rearward direction of a movement direction DM. The first connector 170MB may include a cable 170MBC and a terminal 170MBT. The exterior of the cable 170MBC may be formed by a flexible material but may be formed to have tension without sagging. Accordingly, the connection between the connectors 170MB and 170S1B may be facilitated due to tension at the time of the first connector connection Co1, and effective direction switching of the cluster transport robot G100 may be performed during the movement.

The first slave transport robot 100S1 may include a second connector 170S1B at a predetermined point of the main body so as to face the forward direction of the movement direction DM, and the second connector 170S1B may include a cable 170S1BC and a terminal 170S1BT.

The terminal 170MBT of the first connector 170MB may be coupled with the terminal 170S1BT of the second connector 170S1B. Both terminals 170MBT and 170S1BT are composed of electromagnets, and these terminals are fastened when power is applied, and are released when power is not applied. However, the coupling of the connector may be performed in various ways, and in an alternative embodiment, the connector may be removably coupled to the main body of the transport robot.

Referring to FIG. 3, the cluster transport robot G100 may change the group line. The master robot 100M of the cluster transport robot G100 may change the group line when climbing a ramp having a predetermined inclination angle and/or when the power of the transport robot 100M at the lead position (or another transport robot at the lead position) is insufficient. Based on the information on the group line to be changed, the master transport robot 100M may select the transport robots 100M and 100S1 to be located at the front, and then release the existing connector connections Co1 and Co2 (FIG. 2) and perform new connector connections Co6 and Co7 (AA).

Specifically, a second slave robot 100S2 may include three connector doors 611a to 611c, and connectors 170S2A and 170S2C (170S2B not shown) may or may not be exposed externally for the connector doors 611a to 611c, respectively. That is, the connector doors 611a to 611c may be mapped to the respective connectors 170S2A to 170S2C and may be opened and closed by a connector driver to be described later.

The second slave robot 100S2 performs the connector connection Co2 by using the connector 170S2B (shown in FIG. 2) opened through the second door 611b at the existing connector connection Co2 (in the example of FIG. 2). However, the second slave robot 100S2 may open the first connector 170S2A and the third connector 170S2C hidden in the first door 611c to connect to the transport robots 100M and 100S1 located at the front in FIG. 3.

The connectors 170MB and 170S1B of the transport robots 100M and 100S1 at the lead position may perform the connector connections Co6 and Co7 with the connectors 170S2A and 170S2C of the second slave robot 100S2, respectively. In FIG. 3 it is described that two transport robots are connected by using one connector, but two or more connectors may be implemented to connect the transport robots.

Figure 4:
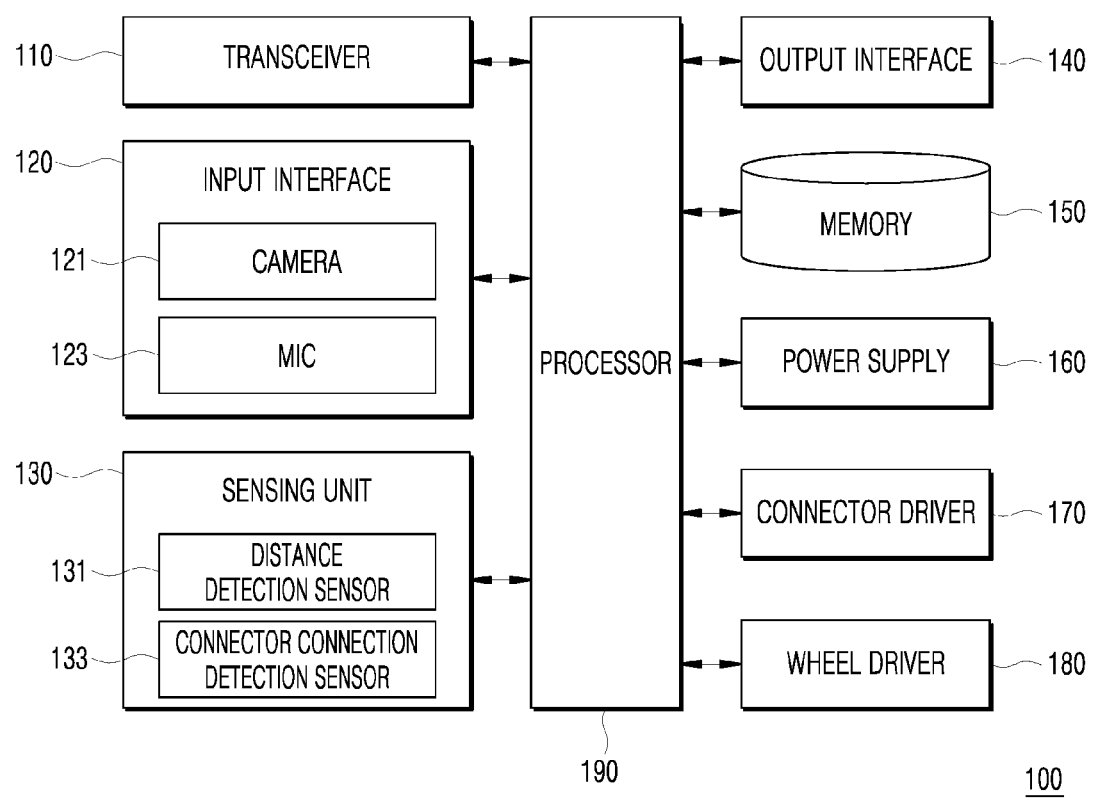
FIG. 4 is a block diagram illustrating a configuration of a transport robot according to one embodiment of the present disclosure.

FIG. 4 is a block diagram illustrating a configuration of the transport robot 100 according to one embodiment of the present disclosure. The transport robot 100 may be of various sizes, and the transport robot 100 may include a transceiver 110, an input interface 120, a sensing unit 130, an output interface 140, a memory 150, a power supply 160, a connector driver 170, a wheel driver 180, and a processor 190. The components shown in FIG. 4 are not essential for implementing the transport robot 100, and thus the transport robot 100 described herein may have more or fewer components than those listed above.

The transceiver 110 may include a wired or wireless communication module capable of communicating with the robot control system 300. In an alternative embodiment, the transceiver 110 may be equipped with a module for Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, and Near Field Communication (NFC).

The input interface 120 may include a user input interface for receiving information from a user. In an alternative embodiment, the input interface 120 may include a camera 121 from which the input interface 120 receives an image signal and a microphone 123 (hereinafter referred to as "mic") from which the input interface 120 receives an audio signal. The camera 121 or the mic 123 may be regarded as a sensor, and thus a signal obtained by the camera 121 or the mic 123 may be referred to as sensing data or sensor information.

The input interface 120 may obtain, for example, learning data for model learning and input data used when output is obtained using a learning model. The input interface 120 may obtain raw input data. The processor 190 may extract an input feature by preprocessing the input data.

The sensing unit 130 may obtain at least one of internal information of the transport robot 100, surrounding environment information of the transport robot 100, or user information by using various sensors. The sensing unit 130 may include, for example, a satellite-based position receiving sensor, a distance detection sensor 131, a connector connection detection sensor 133, an illumination sensor, an acceleration sensor, a magnetic sensor, a gyro sensor, an inertial sensor, an RGB sensor, an infrared (IR) sensor, a finger scan sensor, an ultrasonic sensor, an optical sensor, a mic, a light detection and ranging (LiDAR) sensor, a barometer sensor, and/or a radar sensor.

The connector connection detection sensor 133 may detect that the connector of the transport robot 100 has been connected to the connector of an adjacent transport robot.

The output interface 140 may generate an output such as a visual output, an audible output, or a haptic output. The output interface 140 may include, for example, an optical output interface and a display for outputting visual information, a speaker for outputting auditory information, an ultrasonic output interface for outputting an ultrasonic signal belonging to inaudible frequency, and a haptic module for outputting haptic information.

The memory 150 stores data supporting various functions of the transport robot 100. The memory 150 may store a plurality of application programs or applications running on the transport robot 100, data for the operation of the transport robot 100, and commands for the transport root 100. The memory 150 may store information necessary to perform an operation by using artificial intelligence, machine learning, and artificial neural network. The memory 150 may store a deep neural network model. The deep neural network model may be used to infer result values for new input data rather than training data. The inferred value may be used as the basis for the judgment to perform any operation.

The power supply 160 receives power from an external power source or an internal power source, under the control of the processor 190, and supplies power to each of the components in the transport robot 100. The power supply 160 includes a battery which may be a built-in battery or a replaceable battery. The battery may be charged via a wired or wireless charging method, and the wireless charging method may include a magnetic induction method or a magnetic resonance method.

The connector driver 170 is a module for operating one or more connectors that may be mounted on or coupled to the main body, and may control, for example, the movement of the connector, and the opening and closing of the connector door. The connector may maintain tension when coupled, and once coupled, the connector may be flexibly operated.

The wheel driver 180 may move the transport robot 100, including the main body, by controlling a plurality of wheels. The processor 190 may operate the wheel driver 180 in an electromotive mode and/or a power generation mode, which will be described later.

The processor 190 is a module for controlling the configurations of the transport robot 100. The processor 190 may refer to a hardware-embedded data processing device having a physically structured circuit to execute functions represented as instructions or codes included in a program. Examples of the data processing device built in a hardware include, but are not limited to, processing devices such as a microprocessor, a central processing unit (CPU), a processor core, a multiprocessor, an application-specific integrated circuit (ASIC), and a field programmable gate array (FPGA).

When the transport robot 100 forms a group line with a plurality of transport robots through a connector connection, the processor 190 may control the wheel driver 180 such that the transport robot 100 moves together with the plurality of transport robots based on predetermined destination information. The destination information may be previously stored in the memory 150, received from the robot control system 300, or inputted by a user.

The processor 190 may operate the wheel driver 180 in an electromotive mode or a power generation mode. In the electromotive mode, the processor 190 may control the wheel driver 180 such that electrical energy generated from the power supply 160 is converted into mechanical energy for rotating the plurality of wheels. The processor 190 may convert electrical energy into mechanical energy by using the principle of an electric motor in which, when current flows in a coil, the coil is rotated again under force by the generated magnetic field. To this end, a motor is mounted on the wheel driver 180, and the motor may include a rotor and a stator.

When the wheel driver 180 operates in the power generation mode, the processor 190 may control the wheel driver 180 such that mechanical energy from the rotation of a plurality of wheels is converted into electrical energy for charging the power supply 160. The processor 190 may convert mechanical energy into electrical energy by using the principle of a generator in which a coil is rotated by rotating a plurality of wheels and a magnetic field passing through the coil is changed to cause an induced current to flow in the coil. In addition, the power of the power supply 160 may be charged by using the converted electrical energy. To this end, a motor having a power generation function is mounted on the wheel driver 180, and the motor having the power generation function may include a rotor and a stator. In an alternative embodiment, a motor having both an electromotive function and a power generation function may be mounted on the transport robot 100.

When operating in the power generation mode, the wheel driver 180 may generate a regenerative braking force in a direction opposite to the direction in which the transport robot 100 moves.

When the transport robot 100 is disposed at an intermediate position (not the lead position and the end position) of the group line, the processor 190 may cause the wheel driver 180 to generate a regenerative braking force on a flat road or a downhill road, thereby charging the power of the power supply 160.

The processor 190 may generate the regenerative braking force appropriately on the downhill road to provide an appropriate braking force for the group line. The processor 190 may receive position information through a GPS-based position receiving sensor, detect the front by using a light detection and ranging (LiDAR) sensor, and detect a change in air pressure by using a barometer sensor.

According to an embodiment, the processor 190 may recognize whether the transport robot 100 is driving on an uphill or downhill road by measuring the inclination of the transport robot 100 with an acceleration sensor and a gyro sensor.

The processor 190 may charge the power supply 160 to generate a greater propulsive force for the transport robot 100 than other transport robots in the group line when the transport robot 100 is disposed at the lead position in the group line.

The processor 190 may recognize an arrangement order of the transport robot 100 in the group line based on a connection state of the connector sensed by the connector connection detection sensor 133. When the transport robot 100 is at the lead position in the group line, the processor 190 may recognize that the transport robot 100 is at the lead position in the group line due to there not being a connector connection facing the front. When the transport robot 100 is at the end position in the group line, the processor 190 may recognize that the transport robot 100 is at the end position in the group line due to there not being a connector connection facing the rear.

The processor 190 may determine that the transport robot 100 is disposed at an intermediate position when the transport robot 100 is not at the leading or end position. More specifically, even when the transport robot 100 is at the intermediate position, the processor 190 may receive the arrangement state of other transport robots through the transceiver 110. For example, when receiving identification information and connection state information of each transport robot through the transceiver 110, the processor 190 may determine the arrangement order of the group line.

When the transport robot 100 is a master transport robot, the processor 190 may perform, for example, more tasks and operations.

The processor 190 may collect, for example, map information, movement route information, movement distance information, transport time information, and ramp information. The processor 190 may receive information from the robot control system 300 in real-time, and store the information in advance in the memory 150.

The ramp information may include, for example, information on the presence or absence of the ramp disposed on the movement route of the transport robot 100, the inclination information of the ramp. The transport time information may include information on total transport time for completing all transports and information on time for transporting to each transport destination. Accordingly, it may be determined whether the transport speed is delayed in a specific section.

The processor 190 may collect at least one of, for example, information on the number of a plurality of transport robots included in the group line, information on features of the plurality of transport robots included in the group line, information on the weight of a transport article, information on a feature of the transport article, or information related to an article recipient.

The information on features of the plurality of transport robots included in the group line may include, for example, information on the remaining amount of the battery and information on a driving range. The information related to the article recipient may include information for authenticating the user receiving the article.

The processor 190 may determine the arrangement order of the plurality of transport robots in the group line based on the collected information.

The processor 190 may store an algorithm corresponding to a delivery plan in the memory 150. The algorithm corresponding to a delivery plan may be implemented with a neural network algorithm. For example, in case of collecting the above-mentioned information, the neural network algorithm may calculate output data on the reliability (accuracy) of the article transport when the collected information and information randomly inputting the arrangement order of the transport robots in the group line are used as input data. Output data on the reliability of the article transport when the actual data is inputted may be used as ground truth.

The processor 190 may continuously update, to the model for transport plan, the arrangement order of the transport robots in the group line when having the highest reliability of the article transport.

When the arrangement order of the transport robots included in the cluster is determined and the transport robots then move accordingly, the processor 190 may change the arrangement order of the transport robots included in the group line, while the transport robots are moving, based on at least one of information on charging states of power supplies of the transport robots included in the group line, information on whether a ramp is present on a movement route, information on whether the transport article has been transported, or information on the weight of the transport article.

For example, the processor 190 may move, into the middle of the group line, a transport robot which has a charging amount less than or equal to a predetermined amount, a transport robot that has been disposed at the lead position for a predetermined time, and a transport robot that transports a heavy article.

The processor 190 may dispose a plurality of transport robots at the lead position when the inclination angle of the ramp located on the movement route is greater than or equal to a predetermined size. Accordingly, transport efficiency may be improved.

When changing the arrangement order of the group line, the processor 190 may sequentially dispose the transport robots in a new group line, starting from a transport robot to be disposed at the lead position of the group line to a transport robot to be disposed at the end position of the group line, based on the movement direction. In this example, during formation of the group line, an unnecessary process of performing a connector connection according to an overlapped movement line and then releasing the connector connection again may not occur.

Figure 5:
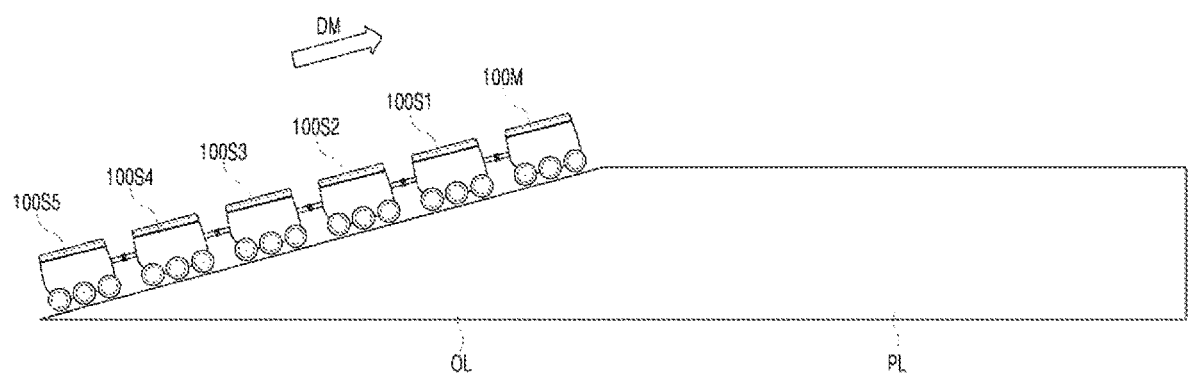
FIGS. 5 and 6 are diagrams for explaining operations of a plurality of transport robots forming a group line, when moving on a ramp, according to various embodiments of the present disclosure.
Figure 6:
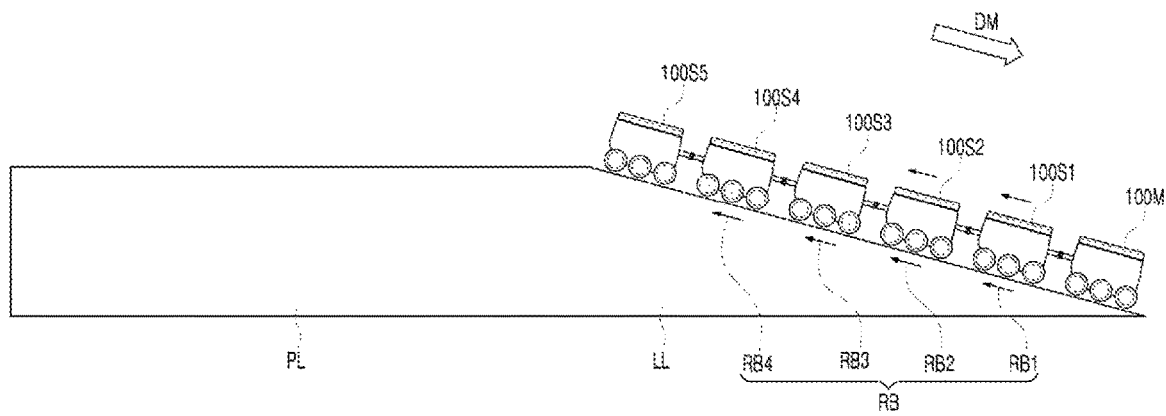

FIGS. 5 and 6 illustrate operations when the transport robot 100 moves on a ramp. FIG. 5 is a diagram for explaining a plurality of transport robots forming a group line, when climbing the ramp, according to one embodiment of the present disclosure. FIG. 6 is a diagram for explaining a plurality of transport robots forming a group line, when descending the ramp, according to one embodiment of the present disclosure.

Referring to FIG. 5, a plurality of transport robots 100M to 100S5 forming a group line is climbing the ramp. The master robot 100M disposed at the lead and the slave robot 100S5 disposed at the end may require the most power. In this example, the transport robots 100S1 to 100S4 disposed in the middle of the group line may move while conserving power.

Referring to FIG. 6, a plurality of transport robots 100M to 100S5 forming a group line is descending the ramp. The transport robots 100S1 to 100S4 disposed in the middle of the group line may generate a regenerative braking force while operating in a power generation mode.

The transport robots 100S1 to 100S4 disposed in the middle of the group line may automatically drive by means of gravity while charging the battery, thereby minimizing power consumption of the transport robots included in the moving group line. The master robot 100M and the end slave robot 100S5 may provide a propulsive force in the movement direction or a braking force in a direction opposite to the movement direction, based on the inclination angle of the ramp and transport robots 100S1 to 100S4 disposed in the middle of the group line.

Figure 7:
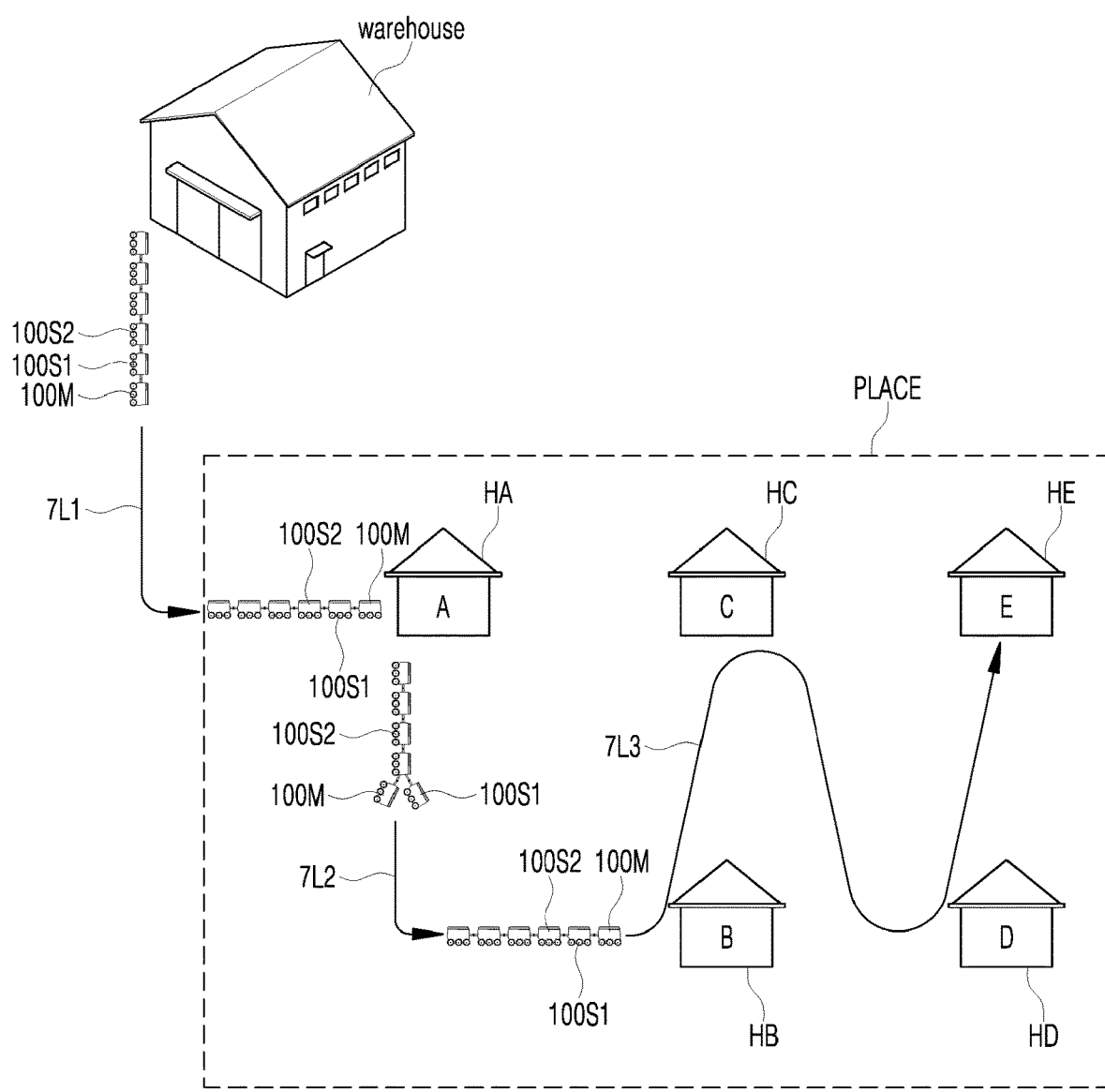
FIG. 7 is a diagram for explaining an operation of a plurality of transport robots forming a group line, which move via a plurality of transport destinations, according to one embodiment of the present disclosure.

FIG. 7 is a diagram for explaining how a plurality of transport robots (including 100M to 100S2) forming a group line depart from the warehouse and transport articles en route to transport destinations HA to HE, according to one embodiment of the present disclosure.

A plurality of transport robots forming a group line drive on a first road 7L1 in a line, deliver an article to a first transport destination HA, and then dispose the plurality of transport robots 100M and 100S1 at the lead position and drive on a second road 7L2. The plurality of transport robots may change the group line again to form a line at the end of the second road 7L2, and sequentially visit a plurality of transport destinations HB to HE along a third road 7L3.

Figure 8:
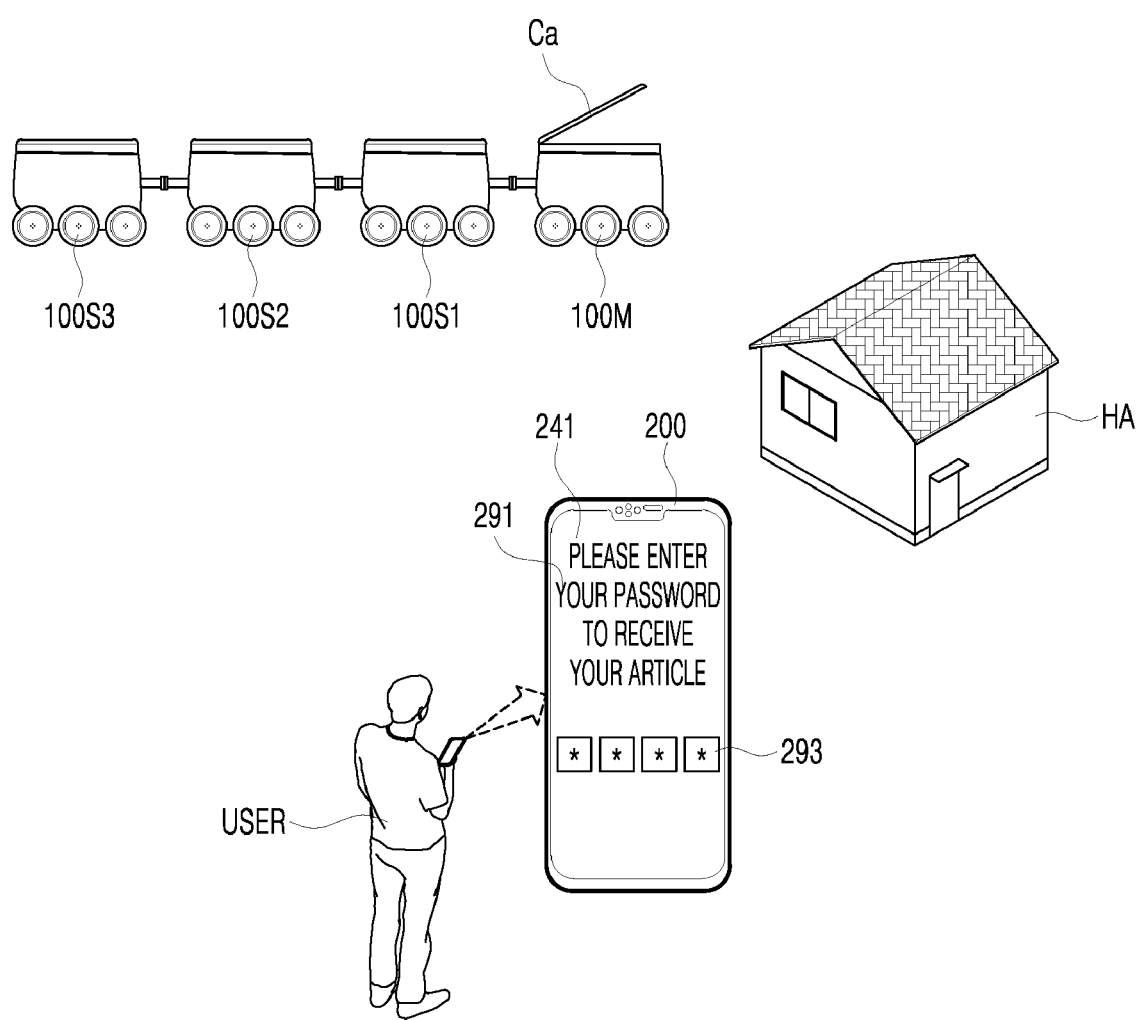
FIG. 8 is a diagram for explaining an operation of a transport robot for delivering an article after performing user authentication, according to one embodiment of the present disclosure.

FIG. 8 is a diagram for explaining a process of delivering an article when the plurality of transport robots forming the group line arrive at a predetermined transport destination HA, according to one embodiment of the present disclosure. One of the plurality of transport robots forming the group line (for example, the master transport robot 100M) may provide a user USER with expected arrival information of an article by means of an alarm shortly before arriving at the transport destination HA. The expected arrival information of the article may be transmitted to the mobile terminal 200 by the robot control system 300.

Upon receiving user authentication from the user USER, the master transport robot 100M may open a cover Ca of the transport robot 100M in which the article is loaded. The user authentication may be applied through not only application authentication but in various ways as well.

Figure 9:
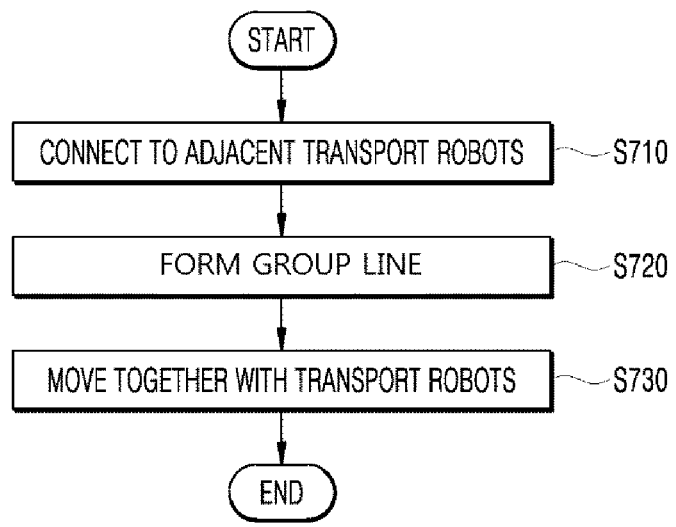
FIG. 9 is a sequence diagram illustrating a method for operating a transport robot, according to one embodiment of the present disclosure.

FIG. 9 is a diagram for explaining a method for operating the transport robot 100, according to one embodiment of the present disclosure. In step S710, the transport robot 100 is connected to adjacent transport robots. That is, the transport robot 100 may be connected to adjacent transport robots through connectors.

In step S720, the transport robot 100 forms a group line. That is, the transport robot 100 may form a group line with a plurality of transport robots through connector connections. In step S730, the transport robot moves together with the plurality of transport robots.

The transport robot 100 may set the operation mode of the transport robot 100 to an electromotive mode or a power generation mode.

When the transport robot 100 is not disposed at the lead position in the formed group line and descends a predetermined ramp, the transport robot 100 may move by setting the operation mode to the power generation mode. In this example, the effect of charging the battery while generating a braking force for the group line may occur.

A greater propulsive force may be generated for the transport robot 100 than other transport robots in the group line when the transport robot 100 is disposed at the lead position in the group line.

The transport robot 100 may determine whether the transport robot 100 climbs or descends the ramp based on information collected from various sensors.

When the transport robot 100 is the master robot, the transport robot 100 may determine an arrangement order of the transport robots included in the group line, based on at least one of map information, movement route information, movement distance information, transport time information, ramp information, information on the number of the plurality of transport robots included in the group line, information on features of the plurality of transport robots included in the group line, information on the weight of a transport article, or information on a feature of the transport article.

When the transport robot 100 is to change the arrangement order in the group line whiling moving, the transport robot 100 may change the arrangement order of the transport robots included in the group line, based on at least one of information on charging states of power supplies of the transport robots included in the group line, information on whether a ramp is present on a movement route, information on whether the transport article has been transported, or information on the weight of the transport article.

The transport robot 100 may dispose a plurality of transport robots at the lead position of the group line when the inclination angle of the ramp located on the movement route is greater than or equal to a predetermined size.

FIG. 10 is a block diagram illustrating a configuration of the robot control system 300 in communication with the transport robot 100, according to one embodiment of the present disclosure. The robot control system 300 may include a system transceiver 310, a system memory 320, and a system processor 330.

The system transceiver 310 may communicate with the transport robot 100. The system memory 320 may store various information due to the system processor 330. The system processor 330 may collect, for example, map information, movement route information, movement distance information, transport time information, and ramp information. The processor 190 may receive the information from the robot control system 300 in real-time, and store the information in advance in the memory 150.

The ramp information may include, for example, information on the presence or absence of the ramp disposed on the movement route of the transport robot 100, and the inclination information of the ramp.

The system processor 330 may collect at least one of information on the number of the plurality of transport robots included in the group line, information on features of a plurality of transport robots included in the group line, information on the weight of a transport article, information on a feature of the transport article, or information related to the recipient.

The information on features of the plurality of transport robots included in the group line may include, for example, information on the remaining amount of the battery and information on a driving range.

The system processor 330 may determine the arrangement order of the plurality of transport robots in the group line based on the collected information.

When the transport robot 100 is the master robot of the group line, the system processor 330 may determine the arrangement order of the transport robots included in the group line, based on at least one of map information, movement route information, movement distance information, ramp information, information on the number of the plurality of transport robots included in the group line, information on features of the plurality of transport robots included in the group line, information on the weight of a transport article, or information on a feature of the transport article.

The system processor 330 may provide the transport robot 100 with the information on the determined arrangement order of the transport robots, through the system transceiver 310. The system processor 330 may determine the arrangement order of the transport robots included in the group line by using an artificial intelligence module. A detailed method therefor has been described and thus may be omitted.

Figure 11:
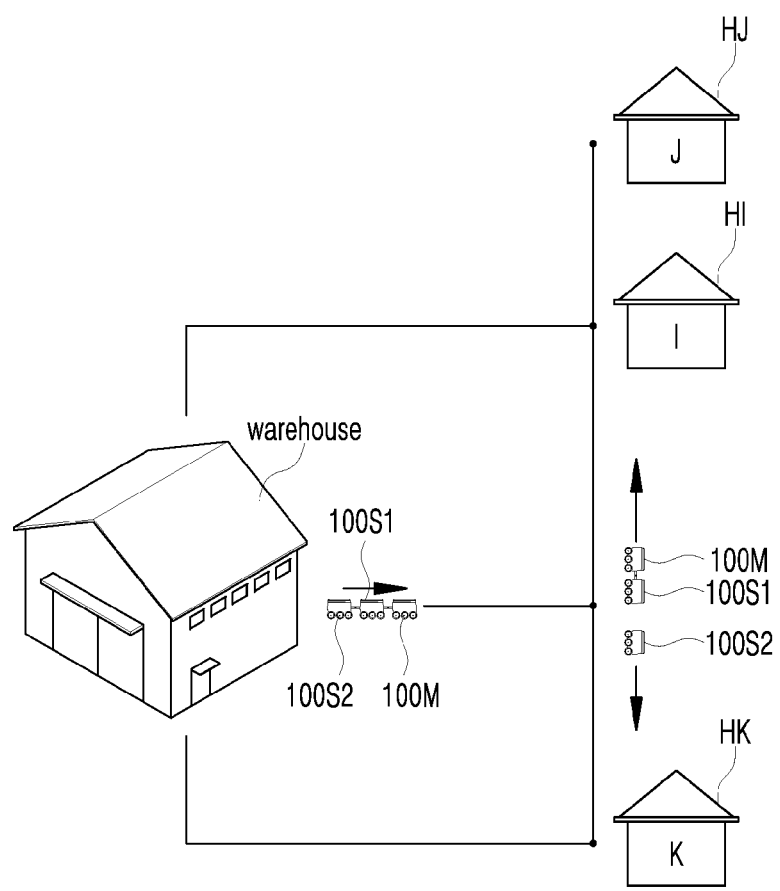
FIG. 11 is a diagram for explaining a method for operating a transport robot, according to one embodiment of the present disclosure.

FIG. 11 is a diagram for explaining a method for operating a transport robot, according to one embodiment of the present disclosure. A plurality of transport robots 100M to 100S2 may depart from the warehouse and move to first to third destinations HI to HK. The first transport robot 100M may be set to be directed to the first destination HI, the second transport robot 100S1 may be set to be directed to the second destination HJ, and the third transport robot 100S2 may be set to be directed to the third destination HK.

The plurality of transport robots 100M to 100S2 may move together along the shortest route. The first transport robot 100M and the second transport robot 100S1, having respective destinations in the same direction, separately move in a first direction, and the third transport robot 100S2 separately moves in a second direction.

As shown in FIG. 11, the transport robot 100 according to one embodiment of the present disclosure may determine whether to perform group driving or independent driving. The determination may be performed by a master transport robot for group driving, but in an alternative embodiment, the determination may be performed by the robot control system 300 and an individual transport robot.

The transport robot 100 may select either group driving or independent driving based on whether a group driving condition is satisfied. Whether the group driving condition is satisfied may be determined based on at least one of map information, movement route information, movement distance information, transport time information, information on whether a ramp is present, information on feature of transport robot, information on the weight of a transport article, or information on a feature of the transport article.

For example, when there is a difference in the movement line between the transport robots as shown in FIG. 11, the transport robot 100 may be separated from other transport robots at an intersection and move to a set destination. In addition, the transport robot 100 may determine group driving based on whether the ramp is present on the movement route.

The transport robot 100 may monitor whether the group driving condition is satisfied in a predetermined time period during group driving or independent driving. The transport robot 100 may move together with a plurality of transport robots or may be separated from the plurality of transport robots and move independently, based on a change in whether the group driving condition is satisfied. Thus, operation efficiency of the transport robot 100 may be improved.

Group driving may be used not only when transport robots physically connected to each other move together, but also when transport robots consistently maintain a predetermined distance therebetween even though the transport robots are not physically connected by using wireless communication.

The present disclosure described above may be implemented as a computer-readable code in a medium on which a program is recorded. The computer-readable medium includes all types of recording devices in which data readable by a computer system can be stored. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. Further, the computer may include the processor 190 of the transport robot 100.

The present disclosure is directed to providing transport robots moving together by forming a group formation with a physical connector, and a method for operating the transport robots.

The present disclosure is further directed to providing a transport robot and a method for operating the transport robot, which minimizes energy consumption when transport robots forming a group formation drive together.

The present disclosure is further directed to providing a transport robot and a method for operating the transport robot, which performs a different operation according to an arrangement order when transport robots forming a group formation climb up and descend down a ramp.

One embodiment of the present disclosure is directed to providing a transport robot, comprising: a main body; a wheel driver configured to control a plurality of wheels for moving the main body; a power supply; and a processor, wherein the processor may be configured to, when the transport robot forms a group line with a plurality of transport robots through a connector connection, control the wheel driver such that the transport robot moves together with the plurality of transport robots based on predetermined destination information.

The processor may be configured to cause the wheel driver to be in one of an electromotive mode that converts electrical energy generated from the power supply into mechanical energy for rotating the plurality of wheels and a power generation mode that converts mechanical energy from the rotation of the wheels into electrical energy for charging the power supply.

One embodiment of the present disclosure is directed to providing a method for operating a transport robot, the method comprising: forming a group line of a transport robot and a plurality of transport robots through a connector connection; setting an operation mode of the transport robot to an electromotive mode or a power generation mode; and when the transport robot is not disposed at the lead position in the formed group line and descends a predetermined ramp, moving by setting the operation mode to the power generation mode.

The method may further include generating a greater propulsive force for the transport robot than other transport robots in the group line when the transport robot is disposed at the lead position in the group line.

The method may further include determining whether the transport robot climbs or descends the ramp based on sensing information collected from at least one of a position receiving sensor, a light detection and ranging (LiDAR) sensor, a barometer sensor, an acceleration sensor, or a gyro sensor.

The method may further include, when the transport robot is a master robot, determining an arrangement order of the transport robots included in the group line, based on at least one of map information, movement route information, movement distance information, transport time information, ramp information, information on the number of the plurality of transport robots included in the group line, information on features of the plurality of transport robots included in the group line, information on the weight of a transport article, information on a feature of the transport article, or information related to an article recipient.

The method may further include, when the transport robot is a master robot, changing the arrangement order of the transport robots included in the group line, based on at least one of information on charging states of power supplies of the transport robots included in the group line, information on whether a ramp is present on a movement route, information on whether the transport article has been transported, or information on the weight of the transport article.

The method may further include disposing a plurality of transport robots at the lead position of the group line when the inclination angle of the ramp located on the movement route is greater than or equal to a predetermined size.

One embodiment of the present disclosure is directed to providing a robot control system, comprising: a system transceiver configured to communicate with a transport robot operating in an electromotive mode or a power generation mode; and a system processor configured to: when the transport robot is a master robot of a group line through a connector connection, determine an arrangement order of transport robots included in the group line, based on at least one of map information, movement route information, movement distance information, transport time information, ramp information, information on the number of a plurality of transport robots included in the group line, information on features of the plurality of transport robots included in the group line, information on the weight of a transport article, information on a feature of the transport article, or information related to an article recipient, and provide the transport robot with the information on the determined arrangement order of the transport robots, through the system transceiver.

According to various embodiments of the present disclosure, a transport robot that moves together by forming a group formation by using a physical connector is provided, which may minimize battery consumption, and thus improve energy efficiency of the transport robot.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transport robot, comprising:
a main body;
a wheel driver configured to control a plurality of wheels to move the main body;
a power supply to provide electrical energy; and
a processor configured to:
control the wheel driver such that the transport robot moves, as one of a plurality of transport robots coupled together, based on destination information, and
control the transport robot to operate in one of an electromotive mode for rotating the plurality of wheels by converting electrical energy from the power supply into mechanical energy and a power generation mode for charging the power supply by converting mechanical energy from rotation of the wheels into electrical energy,
wherein when the transport robot is a master robot of the plurality of transport robots in a group line, the processor is configured to determine an arrangement order of the transport robots included in the group line based on at least one information of the following: map information, movement route information, movement distance information, transport time information, information on whether a ramp is present, information on a number of the plurality of transport robots included in the group line, information on features of the plurality of transport robots included in the group line, information on weight of a transport article, information on a feature of the transport article, and information related to an article recipient,
wherein the processor is configured to:
provide a model corresponding to a transport plan that outputs reliability of article delivery, based on input data that includes at least one of the information and information on the arrangement order of the transport robots included in the group line, and
determine the arrangement order of the transport robots included in the group line, based on the model corresponding to the transport plan.

2. The transport robot of claim 1,
wherein when operating in the power generation mode, the wheel driver is to generate a regenerative braking force in a direction opposite to a movement direction of the transport robot.

3. The transport robot of claim 1, further comprising:
one or more connectors coupled to the main body and to physically connected to one or more adjacent transport robots of the plurality of transport robots, and the one or more connectors disposed to face a front or a rear of the transport robot based on a movement direction of the transport robot; and
a connector sensor configured to sense a connection of the one or more connectors with another one of the transport robots, wherein the processor is configured to recognize an arrangement order of the plurality of transport robots in a group line, based on a connection state of the connector sensed by the connector sensor.

4. The transport robot of claim 3,
wherein when the transport robot is disposed at a lead position of the group line, the processor is configured to cause the power supply to generate a propulsive force for the transport robot that is greater than a propulsive force generated for other ones of the transport robots in the group line.

5. The transport robot of claim 3,
wherein when the transport robot is disposed between a lead position and an end position of the group line and the transport robot is to descend down a predetermined ramp, the processor is configured to operate the transport robot in the power generation mode to charge the power supply.

6. The transport robot of claim 5,
wherein the processor is configured to determine whether the transport robot is to ascend the ramp or is to descend the ramp based on sensing information from at least one of a position receiving sensor, a light detection and ranging (LiDAR) sensor, a barometer sensor, an acceleration sensor, and a gyro sensor.

7. The transport robot of claim 1,
wherein the processor is configured to change the arrangement order of the transport robots included in the group line based on at least one information of the following: information on charging states of power supplies of the transport robots, information on whether a ramp is present on a movement route, information on whether the transport article has been transported, and information on the weight of the transport article.

8. The transport robot of claim 7,
when the processor is to change the arrangement order of the group line, the processor is to sequentially provide the transport robots in a new group line, starting from a transport robot to be disposed at a lead position of the new group line to a transport robot to be disposed at an end position of the new group line, based on the movement direction.

9. A transport robot of claim 7, comprising:
a main body;
a wheel driver configured to control a plurality of wheels to move the main body;
a power supply to provide electrical energy; and
a processor configured to:
control the wheel driver such that the transport robot moves, as one of a plurality of transport robots coupled together, based on destination information, and
control the transport robot to operate in one of an electromotive mode for rotating the plurality of wheels by converting electrical energy from the power supply into mechanical energy and a power generation mode for charging the power supply by converting mechanical energy from rotation of the wheels into electrical energy,
wherein when the transport robot is a master robot of the plurality of transport robots in a group line, the processor is configured to determine an arrangement order of the transport robots included in the group line based on at least one information of the following: map information, movement route information, movement distance information, transport time information, information on whether a ramp is present, information on a number of the plurality of transport robots included in the group line, information on features of the plurality of transport robots included in the group line, information on weight of a transport article, information on a feature of the transport article, and information related to an article recipient,
wherein the processor is configured to change the arrangement order of the transport robots included in the group line based on at least one information of the following: information on charging states of power supplies of the transport robots, information on whether a ramp is present on a movement route, information on whether the transport article has been transported, and information on the weight of the transport article,
wherein the processor is configured to determine at least two of the plurality of transport robots to be provided at a lead position of the group line when an inclination angle of the ramp present on the movement route is greater than or equal to a predetermined size.

10. A transport robot, comprising:
a main body;
a wheel driver configured to control a plurality of wheels to move the main body;
a power supply to provide electrical energy; and
a processor configured to:
control the wheel driver such that the transport robot moves, as one of a plurality of transport robots coupled together, based on destination information, and
control the transport robot to operate in one of an electromotive mode for rotating the plurality of wheels by converting electrical energy from the power supply into mechanical energy and a power generation mode for charging the power supply by converting mechanical energy from rotation of the wheels into electrical energy,
the transport robot further comprising:
one or more connectors coupled to the main body and to physically connected to one or more adjacent transport robots of the plurality of transport robots, and the one or more connectors disposed to face a front or a rear of the transport robot based on a movement direction of the transport robot; and
a connector sensor configured to sense a connection of the one or more connectors with another one of the transport robots,
wherein the processor is configured to recognize an arrangement order of the plurality of transport robots in a group line, based on a connection state of the connector sensed by the connector sensor,
the transport robot further comprising:
a connector driver configured to control operation of the one or more connectors,
a connector door, at the main body, configured to expose the one or more connectors to outside of the transport robot, and
wherein when the transport robot is disposed at a second position of the group line and two or more of the transport robots are disposed at the lead position of the group line, the processor is configured to control the connector driver and the connector door such that each of the one or more connectors facing the front of the transport robot is separately connected to a connector disposed at a rear of one of the two or more of the transport robots.

\* \* \* \* \*